United States Patent

[11] 3,597,999

| [72] | Inventor | Alan R. Fisher |
| | | Highland Park, Mich. |
| [21] | Appl. No. | 878,721 |
| [22] | Filed | Nov. 21, 1969 |
| [45] | Patented | Aug. 10, 1971 |
| [73] | Assignee | Ford Motor Company |
| | | Dearborn, Mich. |

[54] EXTREME RATIO OVERDRIVE POWER TRANSMISSION MECHANISM
6 Claims, 5 Drawing Figs.

| [52] | U.S. Cl. | 74/688, 74/763 |
| [51] | Int. Cl. | F16h 47/08, F16h 57/10 |
| [50] | Field of Search | 74/688, 759, 763 |

[56] References Cited
UNITED STATES PATENTS

| 2,847,877 | 8/1958 | Ravigmeaux | 74/759 |
| 3,339,431 | 9/1967 | Groswhite et al. | 74/688 |
| 3,473,411 | 10/1969 | Paredes | 74/688 |

*Primary Examiner*—Arthur T McKeon
*Attorneys*—John R. Faulkner and Donald J. Harrington

ABSTRACT: A geared, multiple-ratio power transmission mechanism capable of providing torque delivery paths between a power input shaft and a power output shaft in an automotive vehicle driveline, said mechanism being characterized by four forward-driving speed ratios and a single reverse speed ratio, one of the forward-driving ratios being an overdrive with extreme ratio, said torque delivery paths being defined by two simple planetary gear units and a single compound planetary gear unit, said gear units having elements common to each other.

INVENTOR:
ALAN R. FISHER

Fig. 2

| | 96 | 62 | 32 | 76 | 82 | 86 | 90 | 58 | RATIOS | |
|---|---|---|---|---|---|---|---|---|---|---|
| MANUAL LOW | x | | | | x | | | | 2.457 | $1 + \frac{S_1}{R_1}\left(1 - \frac{R_2}{S_2}\right)$ |
| LOW | | | | | x | | | x | 2.457 | |
| INTERMEDIATE | x | | | | x | | | | 1.457 | $\frac{S_1}{R_1} + 1$ |
| HIGH | | | | | x | x | | | 1.000 | |
| HIGH TAKE-OFF | | | | | | x | x | | 1.000 | 1 |
| OVERDRIVE-MINUS | x | | | | | x | | | 0.543 | $1 - \frac{S_2}{R_2}$ |
| OVERDRIVE | x | | | | | x | | | 0.543 | |
| REVERSE | | | x | x | | | | | 2.188 | $\frac{R_3}{S_3}$ |

INVENTOR:
ALAN R. FISHER
BY
ATTORNEYS.

EXTREME RATIO OVERDRIVE POWER TRANSMISSION MECHANISM

GENERAL DESCRIPTION OF THE INVENTION

My invention is adapted to be used in a hydrokinetic torque converter transmission mechanism for use in automotive vehicle drivelines having an internal combustion engine. Such mechanisms usually include a torque converter having an impeller connected to the crankshaft of the engine and a turbine connected to power input elements of the gearing. The converter contributes to the overall torque ration of the transmission mechanism when its speed ratio is less than unity.

I am aware of transmission mechanisms capable of producing an overdrive condition with the overdrive ratio being approximately 0.70. The gearing mechanism of my invention, however, is capable of producing an overdrive ratio much lower than such conventional ratios. For example, it might be as low as 0.4 or 0.5.

I have overcome disadvantages in earlier attempts to provide an overdrive transmission with such extreme ratios while retaining many of the economy and performance advantages inherent in such an overdrive transmission. This is achieved by using a planetary gear system having two simple planetary gear units as well as a single, compound planetary gear unit with elements of each of the gear units being common to the others. A low speed ratio, an intermediate speed ration and a direct drive high-speed ratio can be obtained by controlling the relative motion of the gear elements by means of clutch and brake servos. An upshift from the high speed, direct-drive ratio to the overdrive ratio occurs in two stages. The first stage includes a hydrokinetic torque converter unit as a torque delivery element of the power flow path and the other overdrive stage includes a torque converter lockup clutch which allows torque to be distributed from the engine to the power input elements of the gearing through a torque delivery path that bypasses the converter.

A substantial economy gain measured in terms of improved miles per gallon during operation of the vehicle is experienced by using the extreme ratio overdrive gearing in comparison to a conventional transmission mechanism using a torque converter in combination with direct drive gearing. The economy measured in miles per gallon for my improved overdrive transmission system with a converter in the power flow path is almost equal to the economy for a conventional overdrive transmission with a lockup clutch and an overdrive ratio of 7. This economy is especially apparent at higher vehicle speeds above 50 miles per hour. At the same time the performance of the power train, measured in tractive effort at road load during operation of the vehicle at speeds greater than approximately 30 miles per hour, is substantially equivalent to the corresponding performance of a conventional transmission mechanism with a 0.7 overdrive gear system and a lockup clutch. This due to the fact that the torque loss due to the reduced overdrive gear ratio is compensated for by the torque ratio gain made available by the hydrokinetic converter as the converter operates in the torque conversion range rather than in the coupling range. This performance is available whenever the overdrive transmission components of my improved mechanism are conditioned for operation in the first overdrive operating stage. If a shift to the second operating stage is desired as the vehicle cruises at highway speeds above 50 miles per hour, an economy gain of two to four miles per gallon can be experienced in comparison to the economy available with a conventional 0.70 overdrive transmission with a lockup clutch. High vehicle speed capability is not unduly impaired by using such extreme overdrive ratios when the driveline includes automotive engines of the type now in commercial use.

As ratio changes are made into and out of the extreme overdrive condition, larger engine speed changes are necessary in comparison to the engine speed changes that occur in a conventional 0.70 overdrive transmission. But these speed changes occur without an accompanying harshness because of the influence of the hydrokinetic unit which is active as a torque multiplier under these conditions. The shifts are quieter and more vibration free with no tendency to lug the engine when such ratio shifts occur in the low speed zone of the shift range. The converter in my improved driveline thus performs an additional function that it does not perform in more conventional drivelines. That is, it not only provides slip during idling and extra torque during the acceleration period, but it also provides shift quality as ratio changes are made into an extreme overdrive condition for improved fuel company.

BRIEF DESCRIPTION OF THE FIGURES OF THE DRAWING

FIG. 2 is a chart indicating the clutch and brake engagement and release pattern for the clutch used in the transmission system of FIG. 1.

PARTICULAR DESCRIPTION OF THE INVENTION

Figure 1:
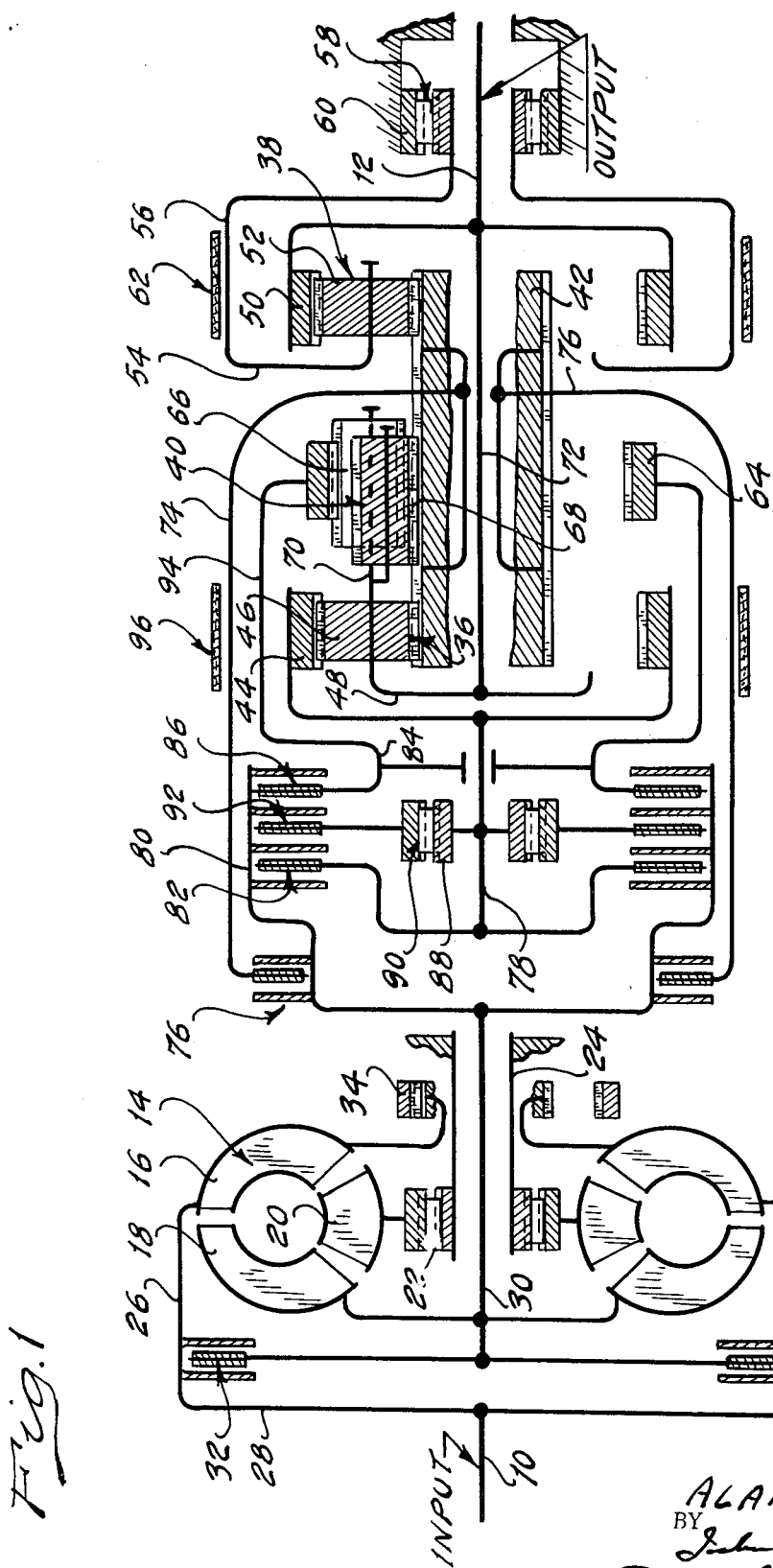
FIG. 1 shows in longitudinal cross-sectional form a schematic diagram of a preferred embodiment of my invention.

In FIG. 1, numeral 10 designates a power input shaft for a transmission system which may be connected directly to the engine crankshaft of an internal combustion engine. Numeral 12 designates the power output shaft for the transmission system. This may be connected through a suitable drive shaft and differential-and-axle assembly to the vehicle traction wheels.

Numeral 14 designates a hydrokinetic torque converter comprising a bladed impeller 16 and a bladed turbine 18 arranged in toroidal fluid flow relationship. A bladed stator 20 is positioned between the flow exit region of the turbine and the flow entrance region of the impeller. An overrunning brake 22 situated between the impeller 20 and a stationary stator sleeve shaft 24 prevents rotation of the stator 20 in a direction opposite to the direction of rotation of the impeller but permits freewheeling motion of the stator 20 in the direction of rotation of the impeller. The impeller 16 includes an impeller shell 26, which may be connected to the shaft 10 by means of a suitable drive shaft 28. A turbine shaft 30 is situated in sleeve 24. A selectively engageable friction clutch 32 establishes and disestablishes a direct connection between the impeller shell 26 and the shaft 30. A positive displacement pump 34 is drivably connected to the impeller 16.

A planetary gear arrangement establishes plural torque delivery paths between the turbine 18 and the shaft 12. This includes a first simple planetary gear unit 36 and a second simple planetary gear unit 38. A compound planetary gear unit 40 is situated between the gear units 36 and 38. A single sun gear 42 forms a part of each of these separate gear units 36, 40 and 38. Gear unit 36 includes a ring gear 44, multiple planet gear elements 46 and a carrier 48. Gear elements 46 are journaled rotatably on the carrier 48 and they mesh directly with ring gear 44 and sum gear 42.

A ring gear 50 forms a part of the gear unit 38. It meshes directly with planet gear elements 52 which are journaled rotatably on carrier 54. Carrier 54 is connected to and rotates with brake drum 56. An overrunning brake 58 is interposed between a stationary overrunning brake race 60 and the hub of brake drum 56. A brake band 62 surrounds the brake drum 56 and is adapted to be engaged and released to complement the one-way braking action of the brake 58.

Gear unit 40 comprises a ring gear 64 which engages drivably a first set of planet pinions 66. These pinions engage a second set of planet pinions 68 which in turn engage the common sun gear 42 for the gear units. Pinions 68 and 66 are journaled rotatably on carrier 70, which is common to the carrier 48. Carrier 48 is connected directly to shaft 72 which in turn is connected drivably to power output shaft 12. Ring gear 50 also is connected directly to power output shaft 12 as indicated.

A torque transfer drive shell or brake drum 74 surrounds the gear units 36 and 40. Drum 74 is connected drivably to the sun gear 42 through a radial wall. Drum 74 is adapted to be connected to driven shaft 30 through a selectively engageable friction clutch 76. Ring gear 44 is connected to an intermediate shaft 78 which in turn is adapted to be connected selectively to clutch drum 80 through a friction clutch 82. Clutch drum 80 is connected directly to the turbine shaft 30.

Clutch drum 80 is adapted to be connected also to sleeve shaft 84 through a selectively engageable friction clutch 86.

Intermediate shaft 78 is connected to the inner race 88 of an overrunning clutch 90. The outer race of this clutch 90 is adapted to be connected selectively to clutch drum 80 through friction clutch 92. Sleeve shaft 84 is connected to ring gear 64 through torque transfer shell 94. Clutches 86 and 92 are engaged and released simultaneously and may be actuated with a common clutch piston. Clutch 82 is operated independently.

To establish low speed ratio operation clutch 82 is applied. This causes turbine torque to be delivered from the driven shaft 30 to the ring gear 44. The other clutches are disengaged. Because the output shaft 12 resists rotation of the carrier 48, sun gear 42 is driven in a direction opposite to the direction of rotation of the ring gear 44. This imparts a forward driving torque to the ring gear 50, which torque is distributed to the output shaft 12. Carrier 54 acts as a reaction point since it is anchored by the overrunning brake 58.

If coast braking is desired during low speed ratio operation, brake band 62 can be applied. In each low speed ratio drive condition a split-torque delivery path is established through the gearing between driven shaft 30 and the output shaft 12.

To initiate a ratio change to the intermediate-speed ratio from a low speed ratio, it merely is necessary to anchor the sun gear 42 by applying brake band 96 which surrounds the drum 74. Sun gear 42 now acts as a reaction point. The clutch 82 remains applied and the other clutches remain released. The turbine torque delivered directly to the ring gear 44 from the shaft 30 imparts a forward driving torque to the carrier 48 and the output shaft 12 as the overrunning brake 58 free wheels.

High-speed ratio operation is achieved by engaging simultaneously the clutches 82, 86 and 92. The elements of the gearing now are locked together for rotation in unison as torque is delivered directly from the shaft 30 to the shaft 12 with a 1 to 1 speed ratio.

By applying the clutches 86, and 92 and releasing the clutch 82, the transmission can be conditioned for an upshift from the high-speed ratio to the overdrive ratio. Under these conditions the gear system remains locked-up to provide a continuing 1 to 1 speed ratio, but the overrunning clutch 90 becomes active as torque is delivered directly from the clutch drum 80 through the shaft 78 and through the clutch 90. By applying reaction brake 96 the common sun gear 42 is capable of establishing a reaction point thus conditioning the mechanism for overdrive operation. With the ring gear 64 acting as a power input element, the carrier 70 and the associated carrier 48 are driven with an overdriving speed ratio. Overrunning clutch 90 free wheels since at this time the ring gear 44 will overspeed the clutch drum 80. This condition represents a first overdrive operating stage with the hydrokinetic torque converter 14 acting as a torque distribution means. A second overdrive operating stage is achieved by engaging the clutch 32, thereby locking out the converter and establishing a direct driving connection between the engine and the power input gear element 64. Brake band 96 continues to anchor the sum gear 42.

Reverse drive is accomplished by engaging simultaneously reverse drive clutch 76 and brake band 62. The other clutches and brakes are released. Driven torque now is delivered directly to the sum gear 42 with the carrier 54 acting as a reaction point. The ring gear 50 and the output shaft 12 are driven in a reverse driving direction.

The previously described clutch and brake engagement and release pattern is illustrated graphically in FIG. 2. The first overdrive stage is indicated in the chart of FIG. 2 by the legend "overdrive minus." The mechanical overdrive or second operating overdrive stage is indicated in the chart of FIG. 2 by the legend "overdrive."

The engagement of the clutches 86, and 92 prior to a ratio shift from the high-speed ratio to the "overdrive minus" condition is indicated in the chart of FIG. 2 by the legend "high takeoff."

Figure 3:
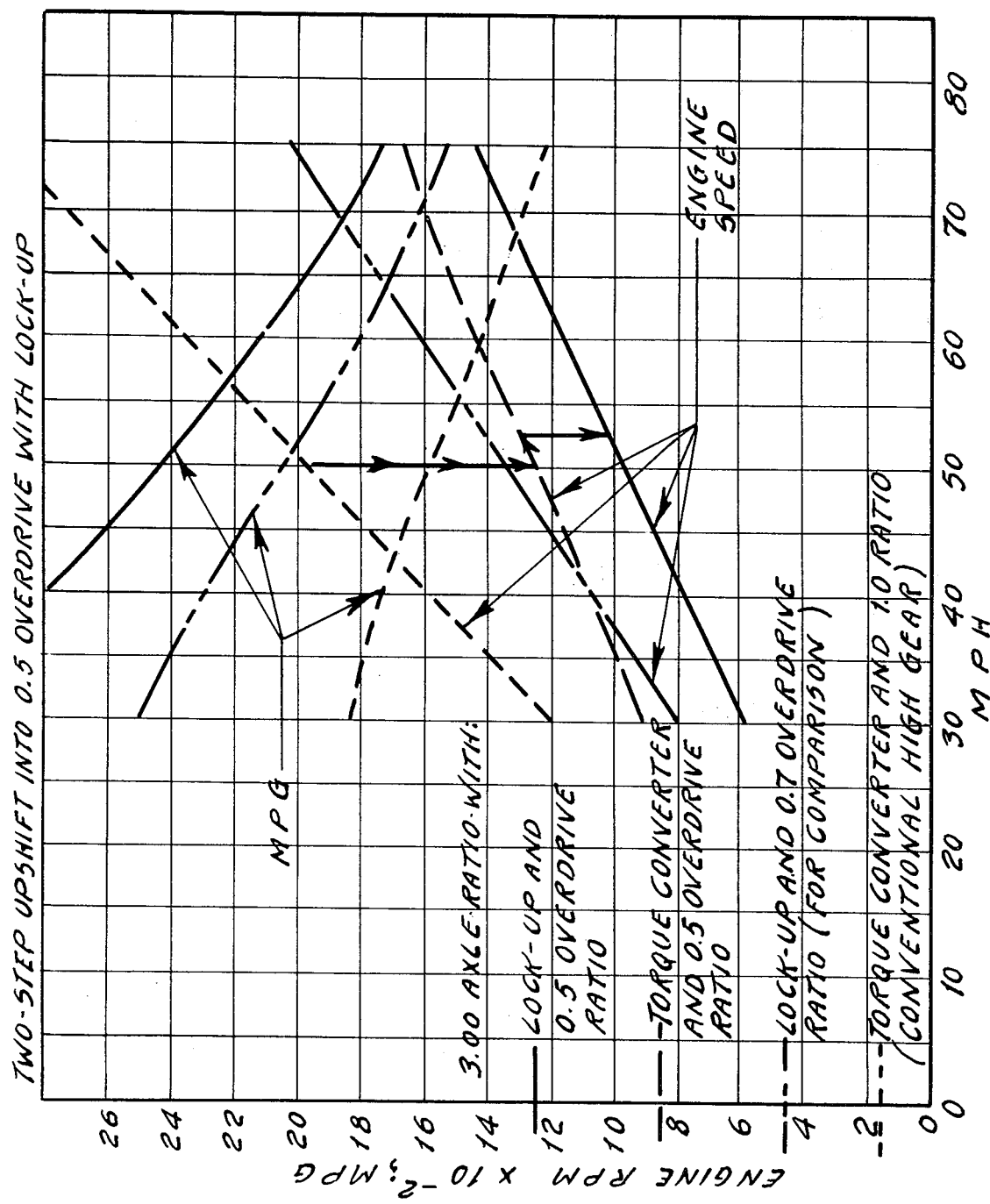
FIG. 3 is a performance chart for an extreme ratio transmission with a 0.5 overdrive and with a lockup clutch together with a comparison with the corresponding performance characteristics of a 0.7 overdrive with a lockup clutch.

In FIG. 3 I have illustrated the performance characteristics of a 0.5 overdrive embodying the features of my invention. This includes a plot of the miles per gallon, which is an indication of overall efficiency under road load conditions. It shows also a plot of engine r.p.m. versus miles per hour for the overdrive condition. This is compared in the graph of FIG. 3 with a 0.7 conventional overdrive transmission and with a conventional torque converter transmission in high-speed ratio without a lockup clutch. The engine speed curve for my improved extreme ratio overdrive transmission also is illustrated in FIG. 3 without the lockup clutch while the torque converter is active. This would correspond to the first overdrive operating stage described in the foregoing paragraphs.

A casual inspection of FIG. 3 will indicate the substantial improvement in operating efficiency that is made available by combining a 0.5 overdrive transmission with a lockup clutch in comparison to a conventional torque converter transmission operating in high gear and with a conventional 0.7 overdrive transmission with a lockup clutch. The accompanying reduced engine speed during operation at high road speeds also is indicated.

Figure 4:
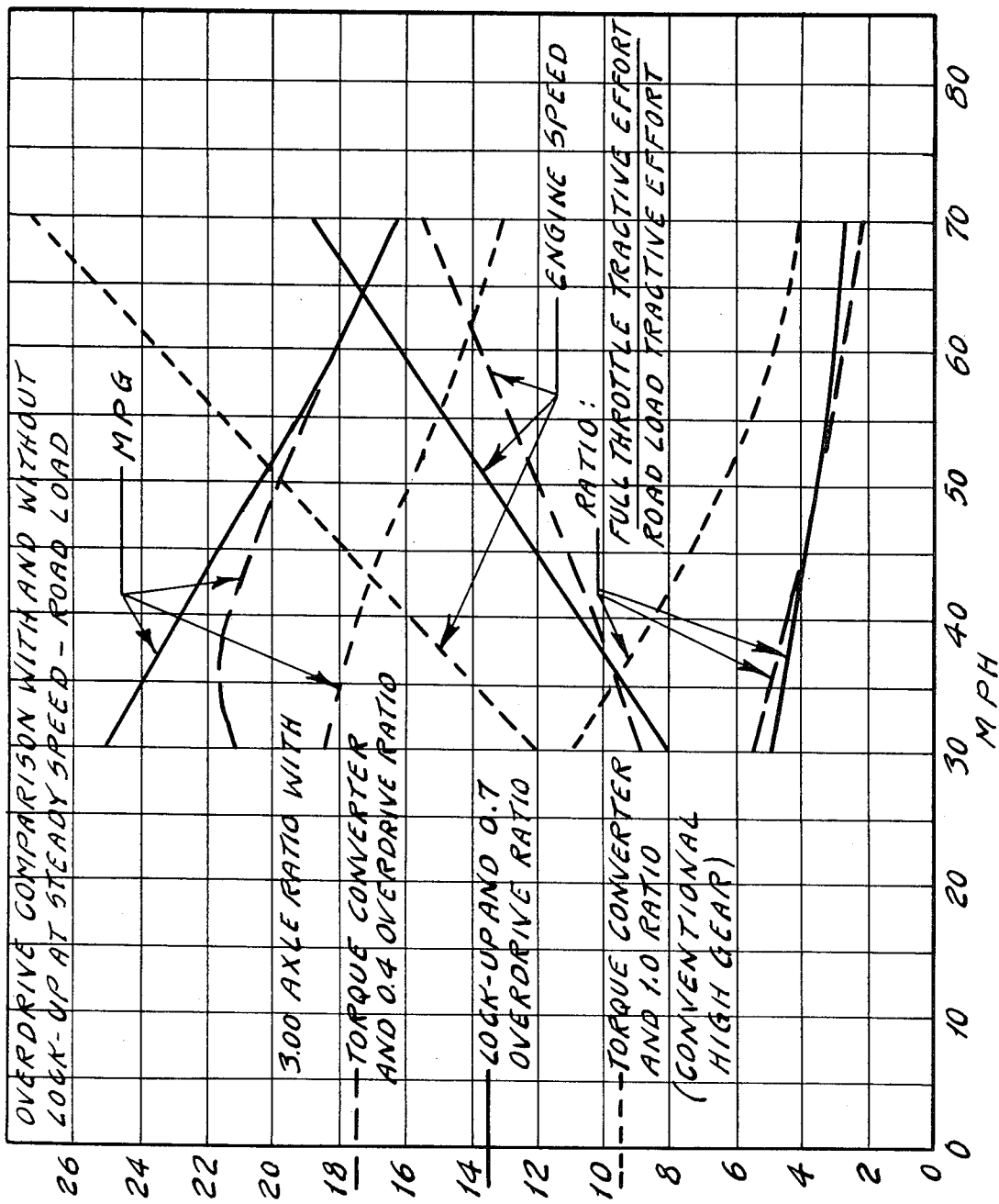
FIG. 4 is a performance chart similar to the performance chart of FIG. 3, although it is prepared for a 0.4 overdrive transmission embodying the features of my invention rather than a 0.5 overdrive transmission.

FIG. 4 shows the economy of a 0.4 overdrive ratio transmission embodying the features of my invention with the hydrokinetic torque converter in comparison with a conventional 0.7 overdrive transmission with a lockup clutch. Although the hydrokinetic torque converter functions as a torque multiplier under these conditions, the operating fuel economy is very close to, if not equal to, the fuel economy for a 0.7 overdrive transmission with a lockup clutch at speeds in excess of approximately 45 miles per hour. This improvement is achieved while the engine is operating at lower speeds, as indicated by the curves in the center of the chart of FIG. 4 where the engine speed for a 0.4 overdrive transmission with a torque converter is compared to the engine speed for a 0.7 overdrive transmission and lockup clutch. The same comparison is made with a conventional torque converter transmission operating in high ratio.

Notwithstanding the reduced engine speed and the very satisfactory operating economy achieved with a 0.4 overdrive transmission embodying my invention, the vehicle performance is not hindered. This is illustrated in the plot of full throttle tractive effort at road load as shown in FIG. 4. The tractive effort achieved with a 0.4 overdrive transmission embodying my invention is compared in FIG. 4 with the corresponding performance curve for a 0.7 overdrive transmission with a lockup clutch. The two tractive effort curves are almost superimposed.

The reduced gear ratio developed by the gearing with a 0.4 overdrive transmission described with reference to FIG. 4 does not result in any significant loss of tractive effort in comparison to a 0.7 overdrive transmission because the converter is available to multiply torque. The converter is operating in the converter range rather than in the coupling range. The operating efficiency of the converter can be designed, however, so that it is substantially the same during operation with the converter ratio above 0.7 as it is with a converter ratio near the converter coupling point. A significant heat loss thus is avoided notwithstanding the fact that the converter is multiplying torque rather than operating merely as a fluid coupling. This characteristic is illustrated, for example, in the chart of FIG. 5 where there is plotted engine speed and fuel economy curves for an eight-cylinder, 427 cubic inch displacement, four-barrel carburetor engine.

Figure 5:
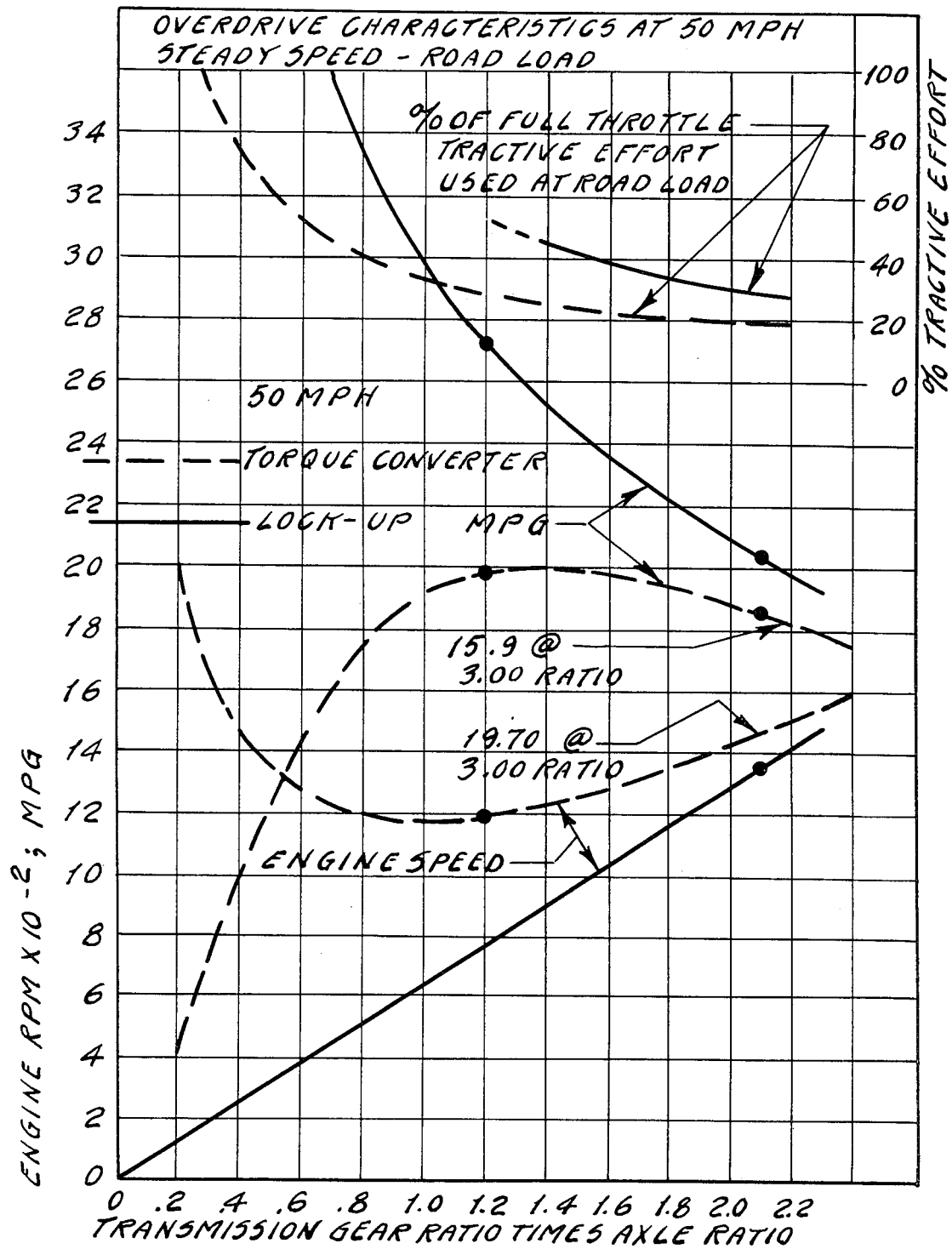
FIG. 5 is a plan of the performance characteristics of a transmission embodying my invention.

It is assumed for purposes of FIG. 5 that the vehicle has a 3.00 axle ratio. A 0.7 overdrive transmission used with such an axle would have an overall ratio of 2.1. This overall ratio is plotted on the abscissa in FIG. 5. The ordinate for the chart of FIG. 5 is engine r.p.m. and mile per gallon. Tractive effort also is plotted on the right-hand side of the chart of FIG. 5 along the ordinate.

When an overdrive ratio 0.4 is used, the overall transmission ratio would be 1.2. The miles per gallon point for an overall ratio 1.2 is essentially the same as miles per gallon point for an overdrive transmission of 0.7 ratio and a lockup clutch. The economy is superior, however, to an overdrive transmission of 0.7 ratio operating with a torque converter. This improvement is due to the characteristics curve of the torque converter, the economy of which comes to a maximum at a speed ratio less than the coupling ratio.

Having described a preferred form of my invention, what I claim and desire to secure by U.S. Letters Patent is:

1. An overdrive power transmission mechanism adapted to deliver driving torque from an engine to a driven member including a hydrokinetic torque converter having a balded impeller and a bladed turbine situated in toroidal fluid flow relationship, planetary gearing comprising first and second simple planetary gear units, each gear unit comprising a ring gear, a sun gear, a carrier and planet pinions journaled rotatably on said carrier, a compound planetary gear unit comprising a ring gear, two sets of planet pinions a carrier journaling each set of pinions, one of said sets of pinions engaging drivably said ring gear, said compound planetary gear unit including also a sun gear drivably engaged with the other of said sets of pinions, said sets of pinions being engageable with each other, the sun gears of said gear units being connected together for rotation in unison, the ring gear of said second simple planetary gear unit being connection to said driven member, means for anchoring the carrier for said second simple planetary gear unit to provide a reaction point during low speed ratio operation, brake means for anchoring the sun gear of said first simple planetary gear unit during intermediate-speed ratio operation and during overdrive ratio operation, selectively engageable clutch means for connecting drivably said turbine to the ring gear of said first simple planetary gear unit during operation in a low speed ratio, an intermediate-speed ration and a high speed ratio, second selectively engageable clutch means for connecting together the ring gear of said compound planetary gear unit and said turbine during overdrive ratio operation with the driven member being overspeeded with respect to the driving speed of the engine, and clutch means for connecting directly the converter impeller and the converter turbine to establish a mechanical drive between said engine and the ring gear of said compound planetary gear unit during overdrive operation.

2. An overdrive power transmission mechanism adapted to deliver driving torque from an engine to a driven member including a hydrokinetic torque converter having a bladed impeller and a balded turbine situated in toroidal fluid flow relationship, planetary gearing comprising first and second simple planetary gear units, each gear unit comprising a ring gear, a sun gear, a carrier and planet pinions journaled rotatably on said carrier, a compound planetary gear unit comprising a ring gear, two sets of planet pinions, a carrier journaling each set of pinions, one of said sets of pinions engaging drivably said ring gear, said compound planetary gear unit including also a sun gear drivably engaged with the other of said sets of pinions, said sets of pinions being engageable with each other, the sun gears of said gear units being connected together for rotation in unison, the ring gear of said second simple planetary gear unit being connected to said driven member, means for anchoring the carrier for said second simple planetary gear unit to provide a reaction point during low speed ratio operation, brake means of anchoring the sun gear of said first simple planetary gear unit during intermediate-speed ratio operation and during overdrive ratio operation selectively engageable clutch means for connecting drivably said turbine to the ring gear of said first simple planetary gear unit during operation in a low speed ratio, an intermediate-speed ratio and a high-speed ratio, second selectively engageable clutch means for connecting together the ring gear of said compound planetary gear unit and said turbine during operation in an overdrive ratio with the driven member being overspeeded with respect to the driving speed of the engine, and clutch means for connecting converter impeller and the converter turbine to establish a mechanical drive between said engine and the ring gear of said compound planetary gear unit during overdrive ratio operation, overrunning coupling means for establishing a one-way torque delivery path between the ring gear of said first planetary gear unit and said turbine when said second clutch means is applied whereby an automatic shift from a direct drive ratio to an overdrive ratio is accompanied by an overrunning motion of the ring gear of said first simple planetary gear unit with respect to said turbine and said second clutch means remains applied during an upshift to the overdrive ratio.

3. The combination as set forth in claim 1 wherein said compound planetary gear unit is intermediate the two simple planetary gear units in a common gear assembly, the second of said simple planetary gear units being axially positioned furthermost with respect to the other gear units from said hydrokinetic torque converter.

4. The combination as set forth in claim 3 wherein each of said gear units has a common sun gear, the planet pinions for each gear unit engaging separate portions of said common sun gear at axially spaced locations.

5. The combination as set forth in claim 2 wherein said compound planetary gear unit is intermediate the two simple planetary gear units in a common gear assembly, the second of said simple planetary gear units being axially positioned furthermost with respect to the other gear units from said hydrokinetic torque converter.

6. The combination as set forth in claim 5 wherein each of said gear units has a common sun gear, the planet pinions for each gear engaging separate portions of said common sun gear at axially spaced locations.